United States Patent [19]
Brown

[11] Patent Number: 5,353,349
[45] Date of Patent: Oct. 4, 1994

[54] TELEPHONE SECURITY SHIELD

[76] Inventor: Lester Brown, 142-18 Booth Memorial Ave., Flushing, N.Y. 11355

[21] Appl. No.: 59,101

[22] Filed: May 10, 1993

[51] Int. Cl.⁵ ............................................. H04M 1/00
[52] U.S. Cl. .................................. 379/450; 379/447; 379/451; 379/437
[58] Field of Search ............... 379/447, 450, 437, 439, 379/451, 456, 445

[56] References Cited

U.S. PATENT DOCUMENTS

| | | | |
|---|---|---|---|
| 3,491,221 | 1/1970 | Zamarra | 379/456 |
| 3,899,647 | 8/1975 | Nachsi et al. | 379/445 |
| 4,546,217 | 10/1985 | Frehn | 379/452 |
| 5,301,230 | 4/1994 | Barry | 379/450 |

Primary Examiner—James L. Dwyer
Assistant Examiner—Jack Chiang
Attorney, Agent, or Firm—Ostrager, Chong & Flaherty

[57] ABSTRACT

A blank which may be erected to form a security shield for public telephones to guard against unauthorized visual access and theft of telephone calling card numbers and information. The blank includes a plurality of hingedly connected panels, and retention slots which engage cradle posts in a conventional telephone housing. A telephone security feature is provided by dimensioning the shield so that it extends around the periphery of the key pad and limits visual access to the user. The shield panels fold into a compact arrangement of overlying panels to facilitate its ready storage and accessibility to the user.

16 Claims, 2 Drawing Sheets

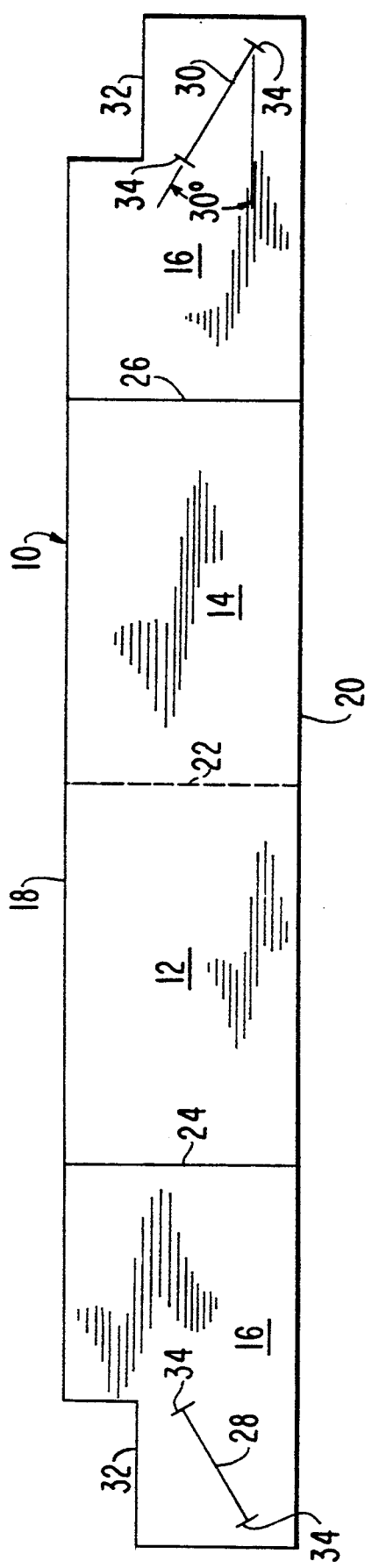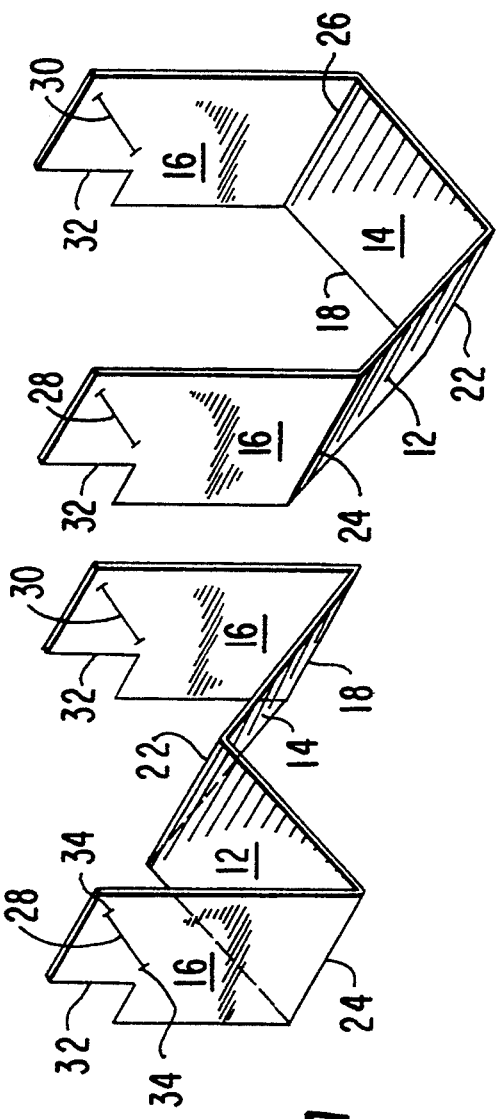

TELEPHONE SECURITY SHIELD

FIELD OF INVENTION

This invention generally relates to security devices for use in public telephones for the maintenance of the confidentiality of telephone number and code information. More particularly, the invention relates to a foldable shield which may be attached to a telephone housing to shield the telephone key pad from unauthorized access when in use.

BACKGROUND ART

Telephone users are being victimized by a new type of theft through the unauthorized use of telephone credit card codes for access to long distance telephone services. Theft of telephone codes is accomplished by observing the telephone key pad as a user inputs credit card codes. Sophistication in theft of telephone services has extended to use by thieves of binoculars and other optical devices to visually access the telephone key pads.

Telephone companies have advised customers that have encountered this theft that it is their obligation to take necessary precautions against this theft of telephone services. The telephone industry, however, has failed to provide the consumer with the means to safeguard against theft of telephone services. The consumer is financially burdened with theft of telephone services without means of redress.

The present invention is directed to a telephone security shield which may readily be attached to public telephones to limit visual access to the telephone key pad to the user. It will be appreciated that such a shield in order to be practical must be of uncomplex design, light weight and readily carried without burden to the user.

Accordingly, it is a broad object of the invention to provide a telephone security shield in the form of a foldable panel which may be removably positioned over a standard telephone key pad to limit visual access to telephone users.

A more specific object of the invention is to provide a telephone security shield which readily folds into a compact configuration for storage and ready accessibility by the user.

DISCLOSURE OF THE INVENTION

In the present invention, these purposes, as well as others which will be apparent, are achieved generally by providing a foldable panel for attachment to a conventional telephone housing to shield the telephone key pad when in use. The panel blank includes a plurality of hingedly connected panels which form an open ended shield, and retention means for removably securing the open shield end in overlying relation to the key pad. A telephone security feature is provided by dimensioning the shield so that it extends around the periphery of the key board and limits visual access to the user.

The foldable panel which is preferably fabricated of a lightweight paperboard or flexible plastic, is dimensioned so that it readily folds into a compact configuration. A preferred dimension for the folded shield approximates the configuration of a standard credit card, 3⅜ inch by 2⅛ inch, which facilitates its ready storage and accessibility to the user.

In a preferred embodiment of the invention, the shield is designed for use with conventional public telephones which include an upright housing, a key pad mounted within the housing, and cradle posts which are positioned above the pad and project outwardly from the housing. The foldable panel in this embodiment has an open end having a generally continuous and even interior edge which rests against the telephone housing. In this preferred embodiment, the retention means includes first and second slots, disposed at an approximate 30° angle to the interior edge which engage the cradle posts. To facilitate arrangement of the foldable panel over the housing keyboard, the retention slots may further be provided with interior cutout portions proximate the first and second slots to accommodate the cradle structure.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF THE DRAWINGS

FIG. 1 is shows a plan view of a blank cut and scored to form the telephone security shield of the invention;

FIG. 2A and 2B are perspective view of the telephone security shield shown in partially unfolded and folded arrangements.

BEST MODE OF CARRYING OUT THE INVENTION

Figure 3:
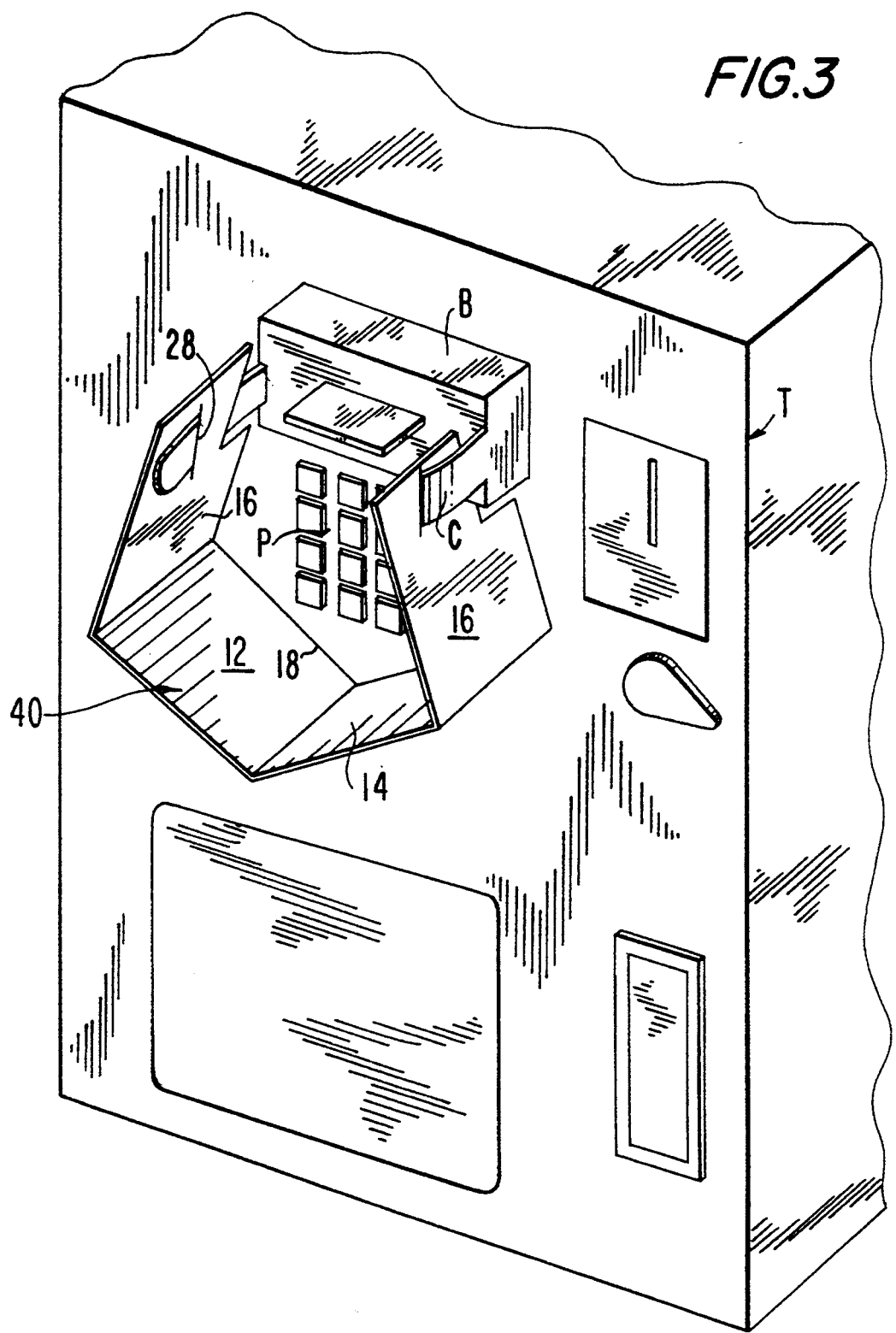
FIG. 3 is a perspective view of telephone security shield of the invention shown positioned on telephone key pad.

Referring now to the drawings, a blank and telephone security shield formed from the blank, respectively designated 10 and 40, are illustrated in FIGS. 1 to 3. The security shield 40 is dimensioned for removable placement over the key pad P of conventional upright telephone T.

The panel blank 10 comprises hingedly connected first and second base panels 12, 14, and side panels 16 which form a continuous open ended shield having interior and exterior peripheral edges 18, 20. The base panels 12, 14 are hingedly connected at a central score line 22; side panels 16 are connected to the base panels 12, 14 at outer first and second scored edges 24, 26. The panel blank 10 further comprises retention means for removable attachment of the shield to the key pad P.

The panel blank 10 is preferably fabricated of a lightweight paperboard which may be coated or flexible plastic and dimensioned so that it readily folds into a compact configuration. See FIG. 2A and 2B. A preferred dimension for the folded panel blank 10 approximates the configuration of a standard credit card, 3⅜ inch by 2⅛ inch, to facilitate its ready storage and accessibility to the user.

In a preferred embodiment, the retention means comprises first and second slots 28, 30 in side panels 16 for engaging telephone cradle posts C. See FIG. 3. To facilitate positioning of the shield in a secure overlying relation to the key pad, the interior peripheral edge 18 preferably has a continuous and even dimension. The side panels 16 may further include cut-out corner sections 32 which conform to the configuration of telephone base structure B of conventional cradle posts C. See FIG. 3. Secure retention of the shield to the cradle posts is obtained by orienting the first and second slots 28, 30 at an approximate 30° angle to the interior edge 18. The slots 28, 30 further comprise opposing end cuts 34, shown in FIGS. 1 and 2, which are dimensioned to accommodate the cradle post dimensions.

It is believed that advantage in the invention telephone shield 40 resides, among other respects, in its simplicity in design and application. The telephone shield 40 of the invention readily attaches to conventional upright public pay telephones. A light weight foldable shield 40 is provided which has the dimensions of a credit card and readily attaches to telephone cradle posts to limit visual access to the key pad to the telephone user. Advantageously, the telephone shield 40 also provides an advertising medium suitable for use by telephone and other public service business concerns. For example, advertisements or public service messages may be printed on the telephone shield and distributed to the public. Alternatively, the shield may be fabricated out of a writable paper to which the user may inscribe telephone numbers, emergency information and other personal information.

Numerous modifications are possible in light of the above disclosure. For example, the drawings show a shield 40 which is designed to house the key pad of an upright telephone housing. It will be appreciated that the panel and retention means configuration of the telephone shield may be modified to accommodate telephones having other designs. Similarly, although retention means is shown which comprises slots 28, 30, other attachment structures are within the scope of the invention.

It is to be understood, therefore, that the abovedescribed embodiment of the invention is merely illustrative, and other embodiments may be devised by those skilled in the art, without departing from the spirit or scope of the invention, as set forth in the appended claims.

I claim:

1. An opaque blank for forming a telephone security shield, the telephone including a housing, and a key pad mounted in said housing, the blank comprising:
   a plurality of hingedly connected panels which form the shield and define an interior area having an open end, said plurality of panels including first and second base panels hingedly attached at a central score line, said first and second base panels having first and second scored edges, and side panels hingedly attached to said first and second score edges; and
   retention means for removably securing said plurality of panels in surrounding and outwardly projecting relation to the key pad, and the open end of the shield in overlying relation to the key pad, such that when the shield is secured, the keypad is in full view only to a user directly in front of the telephone keypad.

2. An opaque blank according to claim 1, wherein the telephone further includes spaced cradle posts which project from the housing, and said retention means comprises first and second slots in the shield which receive the cradle posts.

3. A blank according to claim 2, wherein the telephone housing has an upright orientation, the cradle posts project from a base which is elevated relative to the housing, and said side panels further include cut-out corner sections which generally conform to the configuration of the base.

4. An opaque blank according to claim 1, wherein said first and second base panels, and side panels have a generally rectangular configuration.

5. An opaque blank according to claim 2, wherein the shield has a generally continuous and even interior edge, and said first and second slots are each disposed at an approximate 30° angle formed by the intersection of said interior edge and lines congruent with said first and second slots.

6. An opaque blank according to claim 5, wherein said first and second slots each include opposing end cuts which define the width of said first and second slots.

7. An opaque blank according to claim 1, wherein said first and second base panels and side panels each have approximate equivalent dimensions, and said blank is foldable to arrange said first and second base and side panels in overlying relation.

8. A telephone security shield according to claim 4, wherein said first and second base panels and side panels each have the approximate equivalent dimensions, and said blank is foldable to arrange said first and second base and side panels in overlying relation.

9. A telephone security shield according to claim 8, wherein the blank has a generally continuous and even interior edge, and said first and second slots are each disposed at an approximate 30° angle formed by the intersection of said interior edge and lines congruent with said first and second slots.

10. An opaque blank for forming a telephone security shield, the telephone including a housing, spaced cradle posts which project from said housing, and a key pad mounted in said housing below said cradle posts, the shield having an open end, the blank comprising a plurality of hingedly connected panels which form the shield, and first and second slots in the shield which receive the cradle posts for removably securing the open end of the shield in overlying relation to the key pad.

11. An opaque blank according to claim 10, wherein the shield includes first and second base panels hingedly attached at a central score line, said first and second base panels having first and second scored edges, and side panels hingedly attached to said first and second score edges.

12. An opaque blank according to claim 11, wherein the telephone housing has an upright orientation, the cradle posts project from a base which is elevated relative to the housing, and said side panels further include cut-out corner sections which generally conform to the configuration of the base.

13. An opaque blank according to claim 12, wherein the shield has a generally continuous and even interior edge, and said first and second slots are each disposed at an approximate 30° angle formed by the intersection of said interior edge and lines congruent with said first and second slots.

14. An opaque blank according to claim 13, wherein said first and second slots each include opposing end cuts which define the width of said first and second slots.

15. An opaque blank according to claim 12, wherein said first and second base panels and side panels each have approximate equivalent dimensions and a generally rectangular configuration, and said blank is foldable to arrange said first and second base and side panels in overlying relation.

16. A telephone security shield according to claim 13, wherein said first and second base panels and side panels each have approximate equivalent dimensions, and said blank is foldable to arrange first and second base and side panels in overlying relation.

* * * * *